United States Patent [19]

Fitch

[11] Patent Number: 5,045,715
[45] Date of Patent: Sep. 3, 1991

[54] CIRCUIT FOR GENERATING STRETCHED CLOCK PHASES ON A CYCLE BY CYCLE BASIS

[75] Inventor: Jonathan M. Fitch, Cupertino, Calif.

[73] Assignee: Apple Computer, Inc., Cupertino, Calif.

[21] Appl. No.: 495,329

[22] Filed: Mar. 19, 1990

[51] Int. Cl.$^5$ .................. H03K 3/02; H03K 3/64; H03K 5/13; H03L 7/085

[52] U.S. Cl. .................. 307/269; 307/271; 377/47; 328/20; 328/63

[58] Field of Search .................. 328/58, 60, 62, 63, 328/72, 155, 20, 15; 307/262, 267, 269, 480, 271; 377/47

[56] References Cited

U.S. PATENT DOCUMENTS 4,604,582 8/1986 Strenkowski et al. .................. 328/63

4,691,170 9/1987 Riley .................. 377/47

Primary Examiner—Stanley D. Miller
Assistant Examiner—Sinh N. Tran
Attorney, Agent, or Firm—Blakely, Sokoloff, Taylor & Zafman

[57] ABSTRACT

A clock circuit for generating two clock signals, one (CLK) having stretched clock phases on a cycle by cycle basis, and the second (2X CLK) being a clock signal having a frequency twice the frequency of the first clock signal which is phase and edge coherent with the first clock signal, including the stretched clock phases. The circuit inputs a signal generated by an oscillator which is twice the frequency of the CLK signal which is then used to generate the CLK signal for use by a microprocessor, either phase of which can be stretched on demand, while the second 2X CLK signal remains phase coherent with the microprocessor CLK signal.

6 Claims, 2 Drawing Sheets

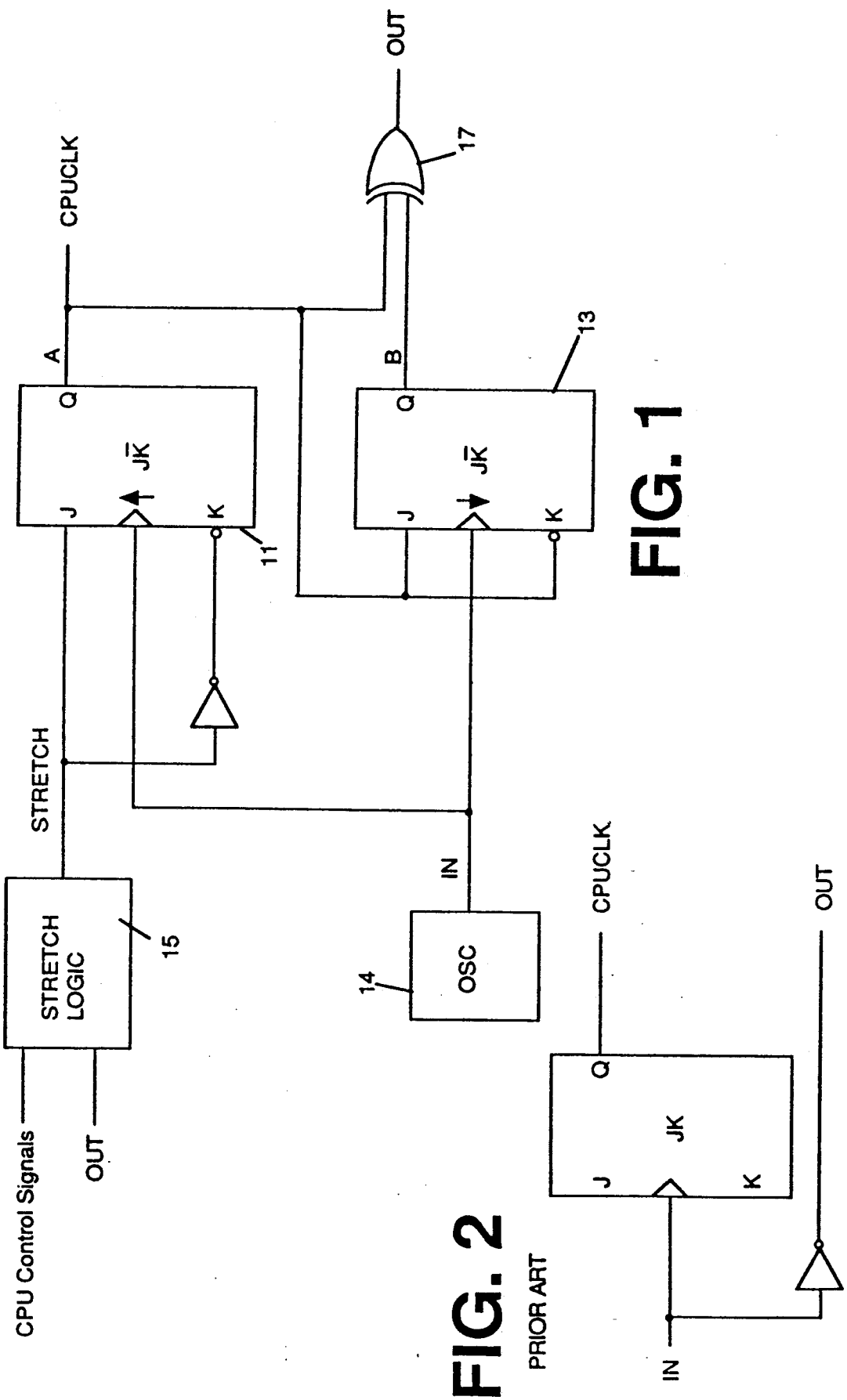

CIRCUIT FOR GENERATING STRETCHED CLOCK PHASES ON A CYCLE BY CYCLE BASIS

SUMMARY OF THE INVENTION

A clock circuit is disclosed that can generate two clock signals from an input clock signal, one (CLK) having stretched clock phases on a cycle by cycle basis, and the second (2X CLK) being a clock signal having a frequency twice the first clock signal which is phase and edge coherent with the first clock signal, including the stretched clock phases. The present invention is a circuit which uses the input clock signal and the 2X CLK signal to generate the CLK signal for use by a microprocessor, either phase of which can be stretched on demand, while the 2X CLK signal remains phase coherent with the microprocessor clock signal. An additional advantage is that the invented circuit can be designed so that there is virtually no skew between the two clocks as might be expected if the microprocessor clock were generated by merely dividing the input clock signal by two as is usually done in the prior art.

BRIEF DESCRIPTION OF THE DRAWINGS

FIG. 1 is a block level diagram of the invented circuit.

FIG. 2 is a block level diagram of a prior art circuit used to generate a CLK signal and a 2X CLK signal.

DETAILED DESCRIPTION OF THE INVENTION

Figure 3:
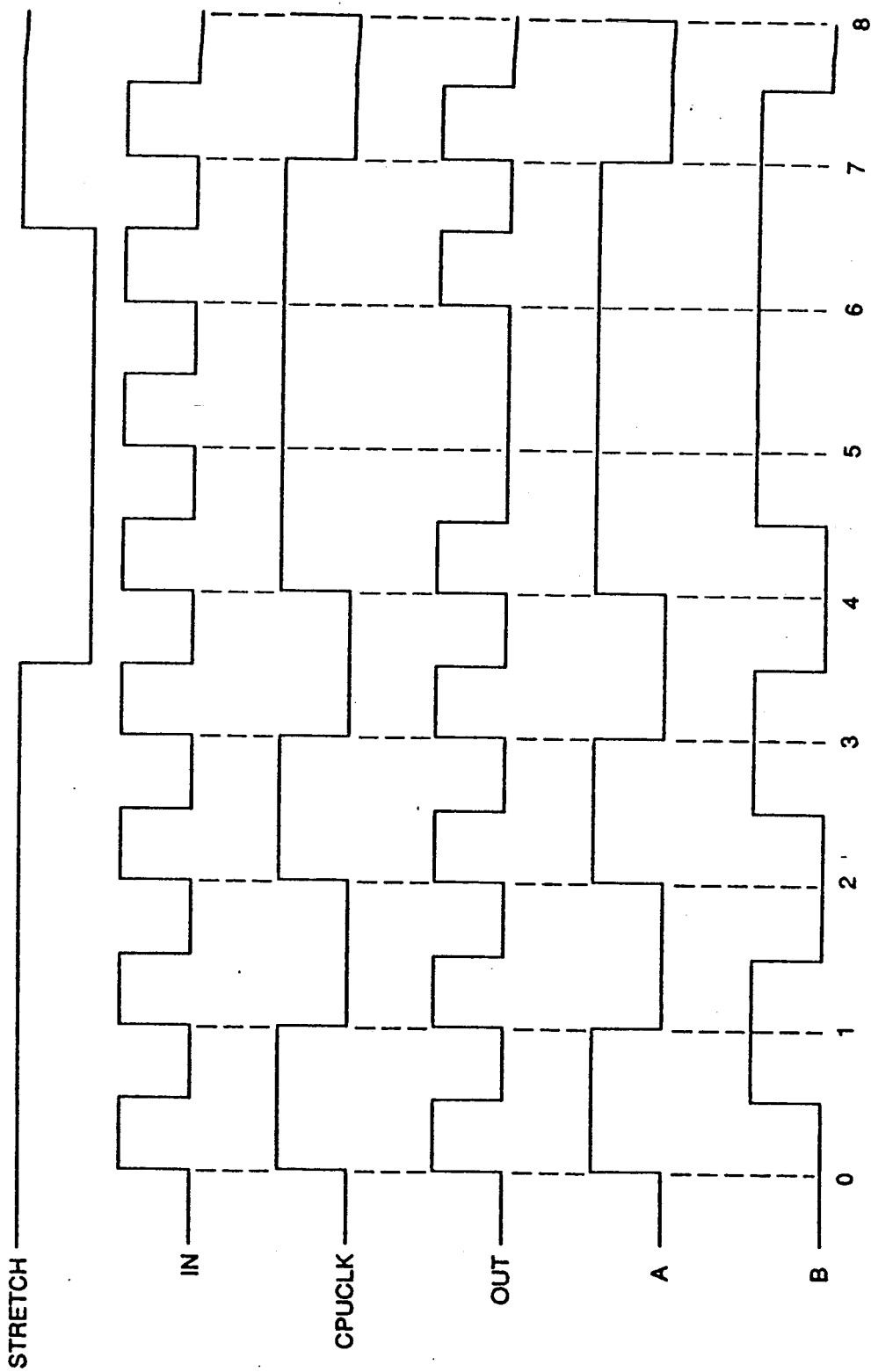
FIG. 3 is a timing diagram show the relative timings of the various signals generated by the circuit of FIG. 1.

Many microprocessors produce control signals from either edge of a microprocessor clock signal. In order to design synchronous interfaces to these processors, it is desirable to have available a clock signal that is twice the frequency (i.e., a 2X clock) and which is phase locked to the microprocessor clock signal. There are many existing interface circuits in use which require such a clock scheme which can be provided using well known techniques. However, in some high performance systems, the microprocessor clock is not held at a constant frequency in that it is stretched during certain clock phases to introduce extra delay whenever needed. For example, such extra delay may be needed to provide a memory access time which exceeds a no wait state bus cycle, but is less than a one wait state cycle.

In general, it is relatively straight forward to produce this clock stretch from an input clock signal using well known state machine techniques. However, a problem arises for those circuits which are using the 2X clock and the microprocessor clock in that during the stretched microprocessor clock phase, two extra clock edges exist on the 2X clock, thereby causing the microprocessor and the 2X clock to no longer per phase coherent. If a 4X clock is available, two edges could be suppressed on the 2X clock during the clock stretch using well known techniques, thus preserving phase coherence. However, at the high end of the performance spectrum, such as microprocessors running at a 25-30 MHz speed or greater, it may be impossible or undesirable to make a 4X clock available. For example, at 30 MHz, a 4X clock would be a 120 MHz clock signal requiring a relatively expensive oscillator and additional shielding to comply with FCC emissions standards.

The present invention is a circuit as shown in FIG. 1 which uses a clock signal IN generated by an oscillator to generate a microprocessor clock signal (CPUCLK), either phase of which can be stretched on demand, and also a 2X clock signal (OUT) which always remains phase coherent with the microprocessor clock. An additional advantage is that the invented circuit can be designed so that there is virtually no skew between the two clock signals CPUCLK and OUT as might be expected if the microprocessor clock signal were generated by merely dividing the input clock signal IN by two.

As shown in FIG. 1, the present invention uses two JK Flip-Flops (JKFFs) 11 and 13, one (11) positive edge triggered and one (13) negative edge triggered, which are set to toggle and be clocked by the clock signal IN from oscillator 14. This creates two clock signals, A and B, of the correct frequency but in quadrature, that is, 90 degrees out of phase. The output of one of the JKFFs, most likely the positive edge triggered one 11, is used for the microprocessor clock signal CPUCLK. This clock signal can be easily phase stretched by logic circuit 15 which generates a signal STRETCH which goes low for one IN clock signal edge, negating the J and K inputs of flip-flop 11 whenever it is desired to stretch the clock signal CPUCLK. The outputs A and B of the two JKFFs are then EX-ORed back together by EXOR gate 17. The quadrature relationship of the inputs to EXOR gate 17 reproduces the 2X clock frequency of the input clock signal IN. However, when the microprocessor clock signal PUCLK is stretched, the two clocks in quadrature rotate phase 180 degrees, causing the EXOR gate output to suppress one pulse (two edges). Thus, the output CPUCLK of JKFF 11 used for the microprocessor clock and the output OUT of EXOR gate 17 remain phase coherent.

Because both the 2X clock signal OUT and the microprocessor clock CPUCLK are generated from similar logic elements (JKFFs 11 and 13), the only skew introduced is by EXOR gate 17 in the 2X clock path. This generally produces much less skew than would be introduced if only the microprocessor clock was generated using a flip-flop as is commonly done in the prior art as shown in the circuit of FIG. 2.

The implementation details of stretch logic circuit 15 depend upon the processor being used. However, such details would be readily apparent to a person skilled in the art armed with the knowledge that the circuit normally generates a logic 1, but inputs CPU control signals which cause it to generate a logic 0 whenever the microprocessor expects a CPUCLK stretch.

FIG. 3 shows the various signals used and generated by the invented circuit. Specifically, FIG. 3 shows eight cycles of the input signal IN generated by oscillator 14, which signal is twice the frequency of the microprocessor clock signal CPUCLK. The signal A or CPUCLK is the signal output by JKFF 11 and is phase coherent with the signal IN. The signal B is the signal output by JKFF 13 and is 90 degrees out of phase with signal A. The signal OUT generated by EXOR gate 17 is a signal which is twice the frequency of the signal CPUCLK and is phase coherent with the signal CPUCLK and is stretched whenever CPUCLK is stretched. In this connection, assuming that it is desired to stretch CPUCLK commencing with a fourth IN signal clock cycle from an arbitrary IN signal clock cycle 0, the signal STRETCH generated by logic circuit 15 switches from logic 1 to logic 0 during the third IN signal clock cycle and then switches from logic 0 to logic 1 during the sixth IN signal clock cycle causing JKFF 11 to stretch CPUCLK for one CPUCLK cycle.

What is claimed is:

1. A circuit for generating first and second clock signals, each cycle of said first and second clock signals having a first phase and a second phase, said second clock signal being twice the frequency of the first clock signal, such that said first and second clock signals are edge and phase coherent during predetermined stretched phases of said first clock signal, said circuit comprising:
   a) oscillator means for generating an input clock signal having a frequency which is twice the frequency of said first clock signal;
   b) first flip-flop means having a clock input coupled to said oscillator means for generating said first clock signal;
   c) stretch logic means coupled to a first input of said first flip-flop means for receiving control signals generated by a processor and for generating a stretch signal indicating phases of said first and second clock signals which are to be stretched based upon said received control signals;
   d) inverter means coupled to said stretch logic means and said first flip-flop means for inverting said stretch signal and supplying said inverted stretch signal to a second input of said first flip-flop means;
   e) second flip-flop means having a clock input coupled to said oscillator means, and first and second inputs coupled to an output of said first flip-flop means;
   f) exclusive OR gate means having a first input coupled to said output of said first flip-flop means for receiving said first clock signal and a second input coupled to an output of said second flip-flop means, said exclusive OR gate means for generating said second clock signal which is input to said stretch logic means and which is twice the frequency said first clock signal and is edge and phase coherent therewith during all phases and all stretched phases of said first clock signal.

2. The circuit defined by claim 1 wherein said first flip-flop means is a positive edge triggered JK flip-flop.

3. The circuit defined by claim 1 wherein said second flip-flop means is a negative edge triggered JK flip-flop.

4. The circuit defined by claim 1 wherein said inverter means is an inverter.

5. The circuit defined by claim 1 wherein said exclusive OR gate means is an exclusive OR gate.

6. A circuit for generating first and second clock signals, each cycle of said first and second clock signals having a first phase and a second phase, said second clock signal being twice the frequency of the first clock signal, such that said first and second clock signals are edge and phase coherent during predetermined stretched phases of said first clock signal, said circuit comprising:
   a) oscillator means for generating an input clock signal having a frequency which is twice the frequency of said first clock signal;
   b) a first positive edge triggered JK flip-flop having its clock input coupled to said oscillator means for generating said first clock signal;
   c) stretch logic means coupled to a first input of said first flip-flop for receiving control signals generated by a processor and for generating a stretch signal indicating phases of said first and second clock signals which are to be stretched based upon said received control signals;
   d) an inverter coupled to said stretch logic means and said first flip-flop for inverting said stretch signal and supplying said inverted stretch signal to a second input of said first flip-flop;
   e) a second negative edge triggered JK flip-flop having its clock input coupled to said oscillator means, and first and second inputs coupled to a Q output of said first flip-flop;
   f) an exclusive OR gate having a first input coupled to said Q output of said first flip-flop for receiving said first clock signal and a second input coupled to a Q output of said second flip-flop, said exclusive OR gate for generating said second clock signal which is input to said stretch logic means and which is twice the frequency said first clock signal and is edge and phase coherent therewith during all phases and all stretched phases of said first clock signal.

* * * * *